United States Patent
Gopalakrishnan et al.

(10) Patent No.: US 9,596,380 B1
(45) Date of Patent: Mar. 14, 2017

(54) METHODS AND SYSTEMS FOR IMAGE COMPRESSION

(71) Applicant: XEROX CORPORATION, Norwalk, CT (US)

(72) Inventors: Sainarayanan Gopalakrishnan, Chennai (IN); Xing Li, Webster, NY (US); Rajasekar Kanagasabai, Chennai (IN); Clara Cuciurean-Zapan, Fairport, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/886,172

(22) Filed: Oct. 19, 2015

(51) Int. Cl.
  *G06K 9/36* (2006.01)
  *H04N 1/413* (2006.01)
  *H04N 1/00* (2006.01)

(52) U.S. Cl.
  CPC ......... *H04N 1/413* (2013.01); *H04N 1/00095* (2013.01); *H04N 2201/0094* (2013.01)

(58) Field of Classification Search
  None
  See application file for complete search history.

(56) References Cited

U.S. PATENT DOCUMENTS

| | | | |
|---|---|---|---|
| 4,903,317 A | 2/1990 | Nishihara et al. | |
| 6,108,455 A * | 8/2000 | Mancuso | G06T 5/20 348/E5.077 |
| 7,483,581 B2 | 1/2009 | Raveendran et al. | |
| 2015/0045928 A1 | 2/2015 | Perez et al. | |

* cited by examiner

*Primary Examiner* — Cheukfan Lee

(57) ABSTRACT

According to embodiments illustrated herein there is provided a method of image compression. The method includes generating a modified image based on a compression of an image. The method further includes generating a first residual layer and a second residual layer based on a comparison of the modified image and the image. The method further includes filtering a set of pixels from the first residual layer and the second residual layer. The method further includes compressing the filtered first residual layer and the filtered second residual layer to generate a compressed first residual layer and a compressed second residual layer. Additionally, the method includes generating a second compressed image based on the modified image, the compressed first residual image and the compressed second residual image.

15 Claims, 8 Drawing Sheets

METHODS AND SYSTEMS FOR IMAGE COMPRESSION

TECHNICAL FIELD

The presently disclosed embodiments are related, in general, to image processing. More particularly, the presently disclosed embodiments are related to methods and systems for image compression.

BACKGROUND

Recent advancements and developments in image capturing technologies have enabled capturing of high-resolution images. Usually, such images may require large storage space compared with the storage space required by low-resolution images. Further, transmitting such high-resolution images may require more bandwidth than that required to transmit low-resolution images.

In certain scenarios, before transmission of the images, the size of the images may be reduced by utilizing one or more image compression techniques. Typically, there exists a trade-off between an image size and a quality of the image. Therefore, during the image compression, the quality of the image may be compromised, if the size of the image is reduced and vice-versa.

Therefore, maintaining a trade-off between the image size and the quality may be a nontrivial task.

SUMMARY

According to embodiments illustrated herein there is provided a method for image compression. The method includes generating, by one or more processors, a modified image based on a compression of an image. The method further includes generating, by the one or more processors, a first residual layer and a second residual layer based on a difference of the first compressed image and the image. The method further includes filtering, by the one or more processors, a set of pixels from the first residual layer and the second residual layer. The method further includes compressing, by the one or more processors, the filtered first residual layer and the filtered second residual layer to generate a compressed first residual layer and a compressed second residual layer. Additionally, the method includes generating, by the one or more processors, a second compressed image based on the modified image, the compressed first residual layer and the compressed second residual layer.

According to embodiments illustrated herein there is provided a system for image compression. The system includes one or more processors configured to generate, a modified image based on a compression of an image. The system further includes the one or more processors configured to generate, a first residual layer and a second residual layer based on a difference of the first compressed image and the image. The system further includes the one or more processors configured to filter, a set of pixels from the first residual layer and the second residual layer. The system further includes the one or more processors configured to compress, the filtered first residual layer and the filtered second residual layer to generate a compressed first residual layer and a compressed second residual layer. Finally, the system includes the one or more processors configured to generate, a second compressed image based on the modified image, the compressed first residual layer and the compressed second residual layer.

According to embodiments illustrated herein there is provided a computer program product for use with a computer, the computer program product comprising a non-transitory computer readable medium, wherein the non-transitory computer readable medium stores a computer program code for image compression. The computer program code is executable by one or more processors to generate, a modified image based on a compression of an image. The computer program code is further executable by the one or more processors to generate, a first residual layer and a second residual layer based on a difference of the first compressed image and the image. The computer program code is further executable by the one or more processors to filter, a set of pixels from the first residual layer and the second residual layer. The computer program code is executable by the one or more processors to compress, the filtered first residual layer and the filtered second residual layer to generate a compressed first residual layer and a compressed second residual layer. Finally, the computer program code is executable by the one or more processors to generate a second compressed image based on the modified image, the compressed first residual layer and the compressed second residual layer.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

Figure 1:
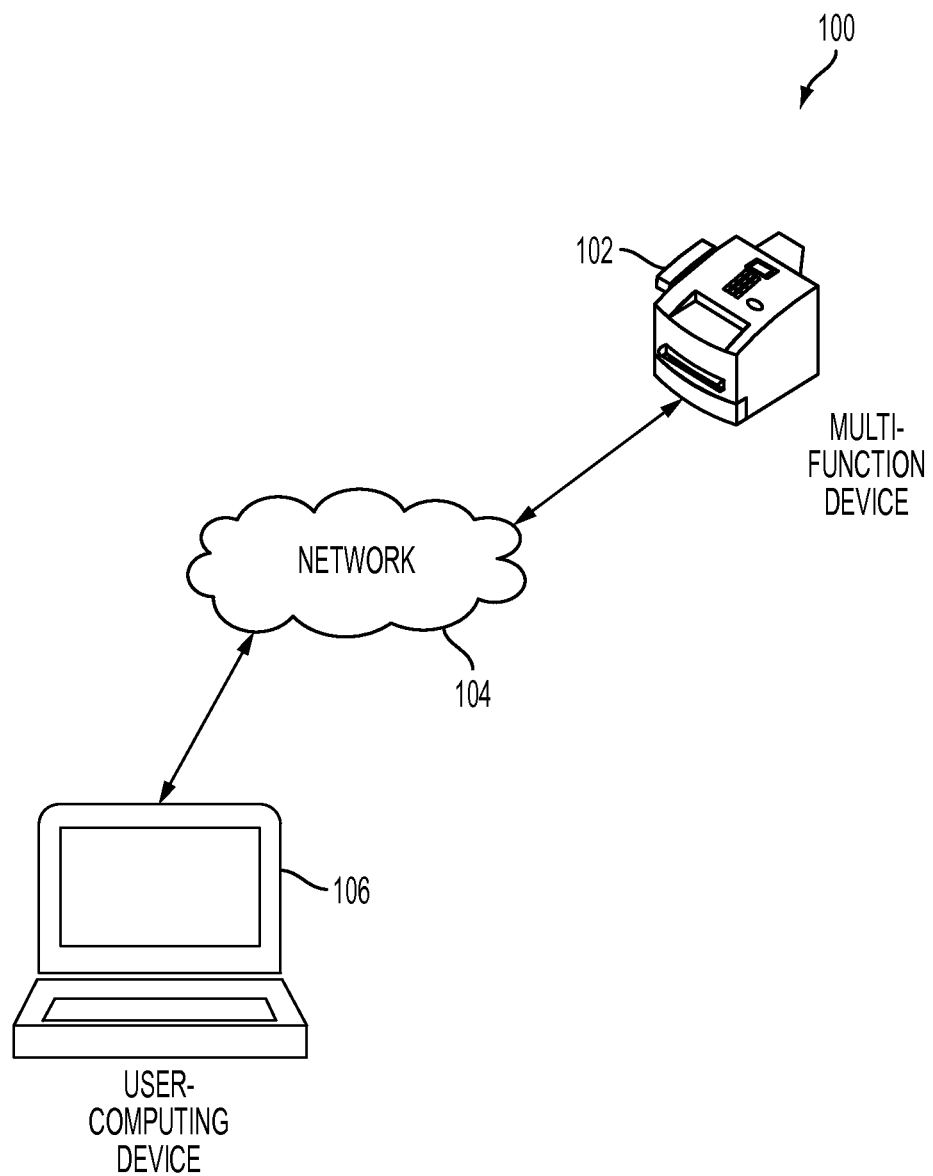
FIG. 1 is a block diagram illustrating a system environment in which various embodiments may be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "at least one embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions: The following terms shall have, for the purposes of this application, the respective meanings set forth below.

An "image" refers to a collection of data, including image data in any format, retained in an electronic form. In an embodiment, the image may correspond to a pictorial representation of an object or a document.

An "image compression" refers to a technique that reduces the size of an image by removing redundant and/or irrelevant image data. In an embodiment, the image compression may be lossy or lossless. A lossy compression of the image include at least a removal of redundant and irrelevant information from the image. In an embodiment, the removed information may not be recovered during the decompression of the lossy compressed image. A lossless compression technique refers to a compression technique, which reduces the size of the image while retaining the image information. In the lossless compression, the compressed image can be recovered completely by decompression.

A "modified image" refers to an intermediate data file that is generated during compression of an original image. In an embodiment, the modified image may comprise patterns, templates, connected pixels and/or the like identified during the compression of the original image. In an embodiment, the modified image may further comprise location information associated with the identified patterns.

A "first compressed image" refers to an image that is obtained when a compression technique, such as a lossy compression technique, is applied on an original image.

A "first residual layer" refers to an image layer generated based on a comparison between an original image and a modified image (i.e., obtained during lossy compression of the original image). In an embodiment, the first residual layer may include one or more pixels added to the original image during the lossy compression.

"One or more first pixels" refer to one or more pixels that are added to an original image during lossy compression of the original image.

A "second residual layer" refers to an image layer generated based on a comparison between an original image and a modified image (i.e., obtained during lossy compression of the original image). In an embodiment, the second residual layer may include one or more pixels removed from the original image during the lossy compression.

"One or more second pixels" refer to one or more pixels that are removed from an original image during lossy compression of the original image.

"Filtering" refers to a process to remove a set of pixels from an image based on a predetermined pixel window.

"A pixel window" corresponds to a cluster of pixels of a predetermined size. For example, if the pixel window has a size of 2×1, the pixel window comprises two pixels. Similarly, if the pixel window has a size of 2×2, the pixel window comprises four pixels. In an embodiment, the pixel window may correspond to a matrix of pixels.

FIG. 1 is a block diagram illustrating a system environment 100 in which various embodiments may be implemented. The system environment 100 includes a multi-function device (MFD) 102, a network 104, and a user-computing device 106.

In an embodiment, the MFD 102 corresponds to a computing device that may be configured to perform one or more first predefined operations. Examples of the one or more first predefined operations may include, but are not limited to, printing, scanning, copying, faxing, and emailing. In an embodiment, the MFD 102 may include a scanner and a printer for scanning and printing one or more documents, respectively. In an embodiment, the MFD 102 may have communication capabilities that enable the MFD 102 to transmit/receive data and messages in accordance with one or more communication protocols such as, but are not limited to, FTP, WebDAV, email, SMB, NFS, and TWAIN. In an embodiment, the MFD 102 may capture an image of an object placed on platen of the MFD 102. In an embodiment, the object may correspond to a document, a hard-copy of an image, or any other object, whose image can be captured by the MFD 102. In an embodiment, the MFD 102 may compress the captured image to generate a first compressed image. In an embodiment, a modified image may be generated, as an intermediate data file during the compression of the captured image by the MFD 102. In an embodiment, the MFD 102 may further generate a second compressed image based on at least the first compressed image. In an embodiment, the generation of the second compressed image has been described later in conjunction with FIG. 3, FIG. 6A, and FIG. 6B. In an embodiment, the MFD 102 transmits the second compressed image to the user-computing device 106, via the network 104. In an embodiment, the structure of the MFD 102 has been described later in conjunction with FIG. 2.

A person having ordinary skills in the art will appreciate that the scope of the disclosure is not limited to the MFD 102 performing the capturing of the image and the compression of the image. In an embodiment, any computing device that has the capability to capture the image of the object and further compress the captured image, may be used in place of the MFD 102.

In an embodiment, the network 104 may correspond to a medium through which content and messages flow between various devices of the system environment 100 (e.g., the MFD 102, and the user-computing device 106). Examples of the network 104 may include, but are not limited to, a Wireless Fidelity (Wi-Fi) network, a Wide Area Network (WAN), a Local Area Network (LAN), or a Metropolitan Area Network (MAN). Various devices in the system environment 100 can connect to the network 104 in accordance with the various wired and wireless communication protocols such as Transmission Control Protocol and Internet Protocol (TCP/IP), User Datagram Protocol (UDP), and 2G, 3G, or 4G communication protocols.

In an embodiment, the user-computing device 106 may correspond to a medium through which the user may provide inputs to control one or more functionalities associated with the user-computing device 106. In an embodiment, the user-computing device 106 may include a special purpose operating system specifically configured to perform one or more second predefined operations. The special purpose operating system may include one or more processors and one or more memories. The one or more memories may include computer readable code, instructions, programs, algorithms, and/or the like that may be executable by the one or more processors to perform the one or more second predefined operations. In an embodiment, the user-computing device 106 may receive the second compressed image from the MFD 102 over the network 104. In an embodiment, the user-computing device 106 may decompress the second compressed image. The process of decompressing the second compressed image has been described later in conjunction with FIG. 5 and FIG. 7. In an embodiment, the user-computing device 106 may correspond to a variety of computing devices, such as, but not limited to, a laptop, a personal digital assistant (PDA), and a tablet computer. The structure of the user-computing device 106 has been described later in conjunction with FIG. 4.

Figure 2:
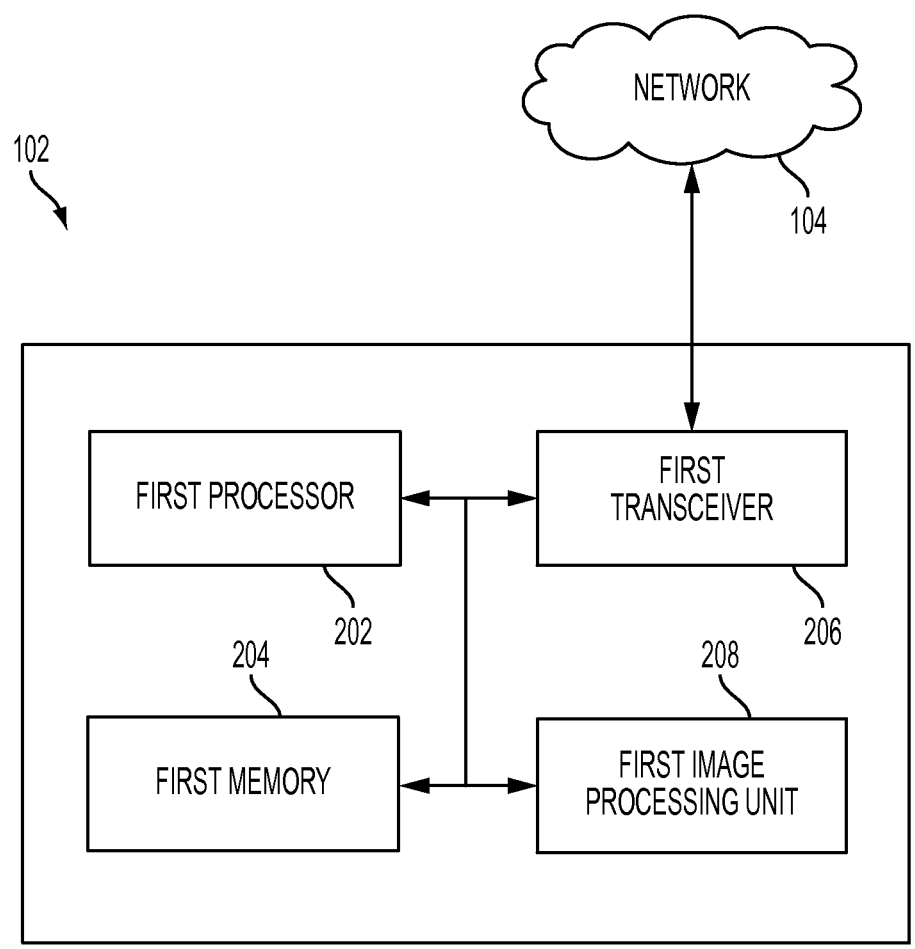
FIG. 2 is a block diagram illustrating a multi-functional device, in accordance with at least one embodiment.

FIG. 2 is a block diagram illustrating the MFD 102, in accordance with at least one embodiment. FIG. 2 has been described in conjunction with FIG. 1. In an embodiment, the MFD 102 includes a first processor 202, a first memory 204, a first transceiver 206, and a first image-processing unit 208.

The first processor 202 is coupled to the first memory 204, the first transceiver 206 and the first image-processing unit 208. The first processor 202 includes suitable logic, circuitry, and/or interfaces that are operable to execute one or more instructions stored in the first memory 204 to perform the one or more first predefined operations on the MFD 102. The first processor 202 may be implemented using one or more processor technologies known in the art. Examples of the first processor 202 include, but are not limited to, an X86 processor, a RISC processor, an ASIC processor, a CISC processor, or any other processor.

The first memory 204 stores one or more sets of instructions, codes, programs, algorithms, data, and/or the like. Some of the commonly known memory implementations include, but are not limited to, a random access memory (RAM), a read only memory (ROM), a hard disk drive (HDD), a solid state drive (SSD), and a secure digital (SD) card. Further, the first memory 204 includes the one or more sets instructions that are executable by the first processor 202 to perform the one or more first predefined operations on the MFD 102. It is apparent to a person having ordinary skills in the art that the one or more sets of instructions stored in the first memory 204 enable the hardware of the MFD 102 to perform the predetermined operations.

The first transceiver 206 transmits and receives messages and data to/from various components of the system environment 100. In an embodiment, the first transceiver 206 may be communicatively coupled to the network 104. Examples of the first transceiver 206 may include, but are not limited to, an antenna, an Ethernet port, an USB port, or any other port that can be configured to receive and transmit data. The first transceiver 206 transmits and receives data/messages in accordance with the various communication protocols, such as, TCP/IP, UDP, and 2G, 3G, or 4G communication protocols.

The first image-processing unit 208 includes suitable logic, circuitry, and/or interfaces that are operable to execute the one or more sets of instructions stored in the first memory 204 to perform the one or more first predefined operations such as, but are not limited to, compression, denoising, and segmentation. The first memory 204 may be operable to store the one or more sets of instructions that are executable by the first image-processing unit 208 to perform the one or more first predefined operations. The first image-processing unit 208 may be implemented using one or more processor technologies known in the art. Examples of the first image-processing unit 208 include, but are not limited to, an X86, a RISC processor, a CISC processor, or any other processor. In another embodiment, the first image-processing unit 208 may be implemented as an Application-Specific Integrated Circuit (ASIC) microchip designed for a special application, such as compressing an image.

The operation of the MFD 102 has been described later in conjunction with FIG. 3.

Figure 3:
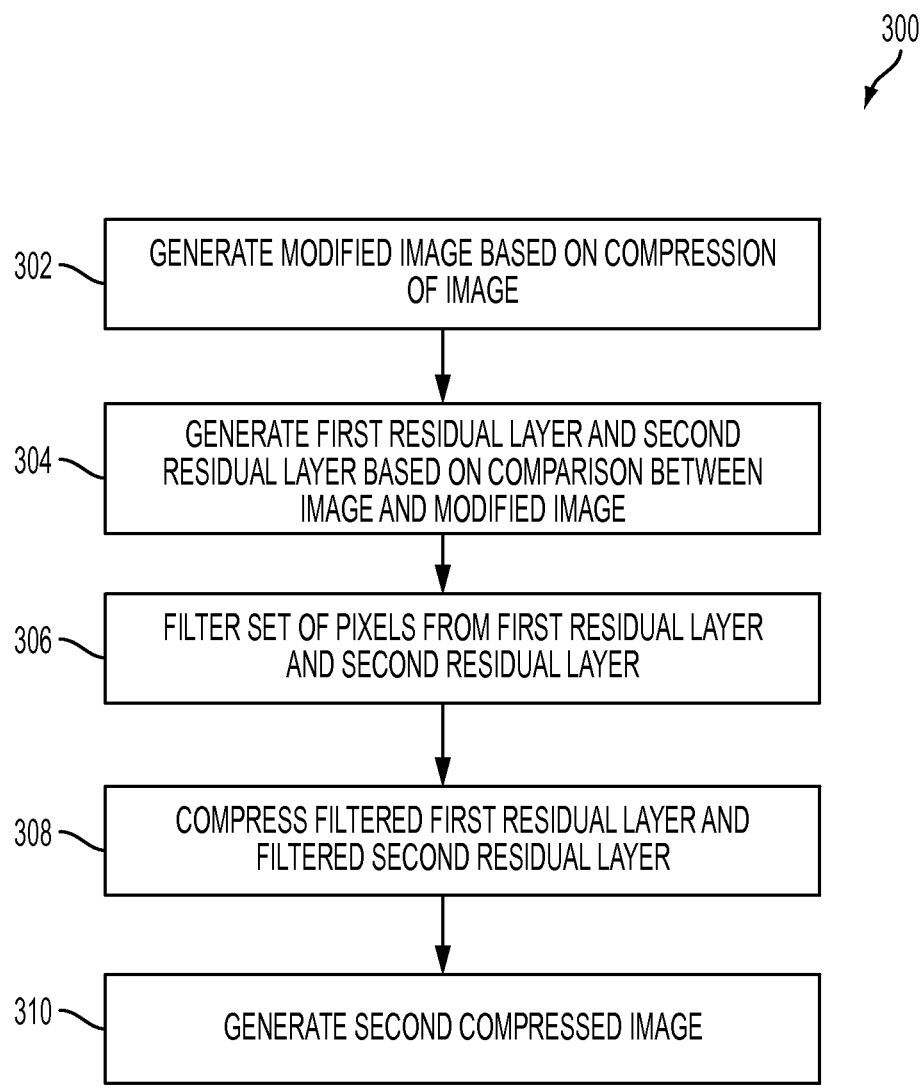
FIG. 3 is a flowchart illustrating a method for compressing an image, in accordance with at least one embodiment.

FIG. 3 is a flowchart 300 illustrating a method of image compression, in accordance with at least one embodiment. The flowchart 300 has been described in conjunction with FIG. 1 and FIG. 2.

At step 302, a modified image is generated based on compression of the image. In an embodiment, the first image-processing unit 208 may be configured to generate the modified image. In an embodiment, prior to generating the modified image, the MFD 102 may be configured to scan the original image to generate the image. In an embodiment, the MFD 102 may include a scanning platen on which the original image is placed. Thereafter, the MFD 102 may scan the original image to generate the image. A person having ordinary skills in the art will appreciate that the scope of the disclosure is not limited to the original image being scanned to generate the image. In an embodiment, any other object, such as a document, can be scanned using the MFD 102.

Further, a person having ordinary skills in the art will appreciate that the scope of the disclosure is not limited to the MFD 102 generating the image. In an embodiment, any device that has the capability of capturing the image using an image capturing device may be able to generate the image. In another embodiment, the MFD 102 may receive the image from the user-computing device 106. In such a scenario, the user of the user-computing device 106 may want to compress the image. The user-computing device 106 may send a request to compress the image. In an embodiment, the request may comprise the image to be compressed. In yet another embodiment, the MFD 102 may be configured to query a database server (not shown) to retrieve the image to be compressed. In an embodiment, the first image-processing unit 208 may apply a lossy compression technique on the image. In an embodiment, some examples of the lossy compression technique may include, but are not limited to, JPEG 2000, JPEG XR, JBIG2, or PGF.

During the compression of the image, the first image-processing unit 208 may be configured to generate the modified image as an intermediate data file. In an embodiment, the first image-processing unit 208 may be configured to identify patterns, templates, connected pixels and/or the like in the image based on a predefined pattern dictionary to generate the modified image. A person having ordinary skills in the art will appreciate that during identification of patterns, templates, connected pixels and/or the like and the dictionary, some of the pixels that were originally present in the image may be removed (i.e., one or more second pixels) from the image. Further, some pixels may be introduced/added (i.e., one or more first pixels) to the image during the pattern matching. The information pertaining to the one or more second pixels and the one or more first pixels may be stored in the modified image.

A person having ordinary skills in the art will appreciate that the scope of the disclosure is not limited to generating the modified image based on the aforementioned method. In an embodiment, any other method known in the art may be used to generate the modified image during the process of compression of the image. Further, the person having ordinary skills in the art will appreciate that the method or technique of generating the modified image may vary based on the type of compression technique being employed to compress the image.

In an embodiment, the first image-processing unit 208 may be further configured to generate a first compressed image based on the modified image.

In an embodiment, the first image-processing unit 208 may store the image, the modified image, and the first compressed image in the first memory 204.

At step 304, a first residual layer and a second residual layer are generated based on a comparison between the image and the modified image during compression of the image. In an embodiment, the first image-processing unit 208 may be configured to generate the first residual layer and the second residual layer. In an embodiment, the first image-processing unit 208 may be configured to retrieve the image and the modified image from the first memory 204. Thereafter, the first image-processing unit 208 may perform a grayscale conversation operation on the image and the first compressed image to generate a grayscale image and a grayscale first compressed image. Thereafter, the first image-processing unit 208 may determine the difference between the grayscale image and the modified image based on the comparison to generate the first residual layer and the second residual layer. In an embodiment, the first residual layer comprises one or more first pixels. The one or more first pixels may include one or more pixels that have been added to the image during the compression of the image. In an embodiment, the second residual layer comprises one or more second pixels. The one or more second pixels may include one or more pixels that have been removed/deleted from the image during the compression of the image. Further, the first image-processing unit 208 may store the first residual layer and the second residual layer in the first memory 204.

An example of the first residual layer and the second residual layer has been described later in conjunction with FIG. 6A and FIG. 6B.

At step 306, a set of pixels is filtered from the first residual layer and the second residual layer. In an embodiment, the first image-processing unit 208 may be configured to filter the set of pixels from the first residual layer and second residual layer. Prior to filtering, the first image-processing unit 208 may be configured to retrieve the first residual layer and the second residual layer from the first memory 204. Further, the first image-processing unit 208 may determine a pixel cluster or a pixel window of a predetermined size based on an input received from the user-computing device 106. Further, the first image-processing unit 208 may determine the pixel cluster or the pixel window based on dots per inch (dpi) of the image and/or a font size of one or more text content, if any, in the image. In another embodiment, the first image-processing unit 208 may extract the pixel cluster or the pixel window from the first memory 204. In an embodiment, the predetermined size of the pixel cluster may correspond to a 2×1 pixel window. In another embodiment, the predetermined size of the pixel cluster may correspond to a 2×2 pixel window. A person having ordinary skills in the art will understand that the scope of the disclosure is not limited to a 2×1 or a 2×2 pixel window or a pixel cluster. In an embodiment, the predetermined size of the pixel window or the pixel cluster may vary based on the application area (or user input) where the disclosed compression technique is being utilized. In another embodiment, the predetermined size of the pixel window or the pixel cluster may depend on a compression ratio that the MFD 102 may want to achieve. In an embodiment, the compression ratio may correspond to a ratio of the size of a compressed image to the size of the original image (i.e., the uncompressed image).

After determining the predetermined size of the pixel window or the pixel cluster, the first image-processing unit 208 may utilize the pixel window or the pixel cluster to identify the set of pixels in the first residual layers and the second residual layer, which are of the predetermined size. For example, the first residual layer comprises the one or more first pixels that are distributed in form of one or more pixel clusters. For instance, the one or more pixel clusters are of size 1×1, 3×4, 10×13, 2×2, and so forth. Further, if the predetermined size of the pixel cluster is 2×2, the first image-processing unit 208 may filter all the pixel clusters that are of size 2×2 from the first residual layer. In an embodiment, all the pixels clusters of the size 2×2 that are filtered out from the first residual layer correspond to the set of pixels. Similarly, the set of pixels are filtered out from the second residual layer. In an embodiment, the first image-processing unit 208 may generate the filtered first residual layer and the filtered second residual layer based on the filtration process described supra. Further, the first image-processing unit 208 may store the filtered first residual layer and the filtered second residual layer in the first memory 204.

At step 308, the filtered first residual layer and the filtered second residual are compressed to generate a compressed first residual layer and a compressed second residual layer. In an embodiment, the first image-processing unit 208 may be configured to compress the filtered first residual layer and the filtered second residual layer to generate a compressed first residual layer and a compressed second residual layer. In an embodiment, the first image-processing unit 208 may compress the filtered first residual layer and the filtered second residual layer using a lossless compression technique. Some examples of lossless compression technique may include, but are not limited to, JPEG LS, JPEG 2000, JBIG2, or TIFF.

At step 310, a second compressed image is generated. In an embodiment, the first image-processing unit 208 may be configured to generate the second compressed image. In an embodiment, the first image-processing unit 208 may generate the second compressed image based on a combination of the first compressed image, the compressed first residual layer, and the compressed second residual layer. In another embodiment, the first image-processing unit 208 may generate the second compressed image based on a combination of the modified image, the compressed first residual layer, and the second compressed residual layer. The first image-processing unit 208 may be configured to store the second compressed image in the first memory 204. In an embodiment, the first processor 202 may be configured to transmit the second compressed image to the user-computing device 106 over the network 104.

Figure 4:
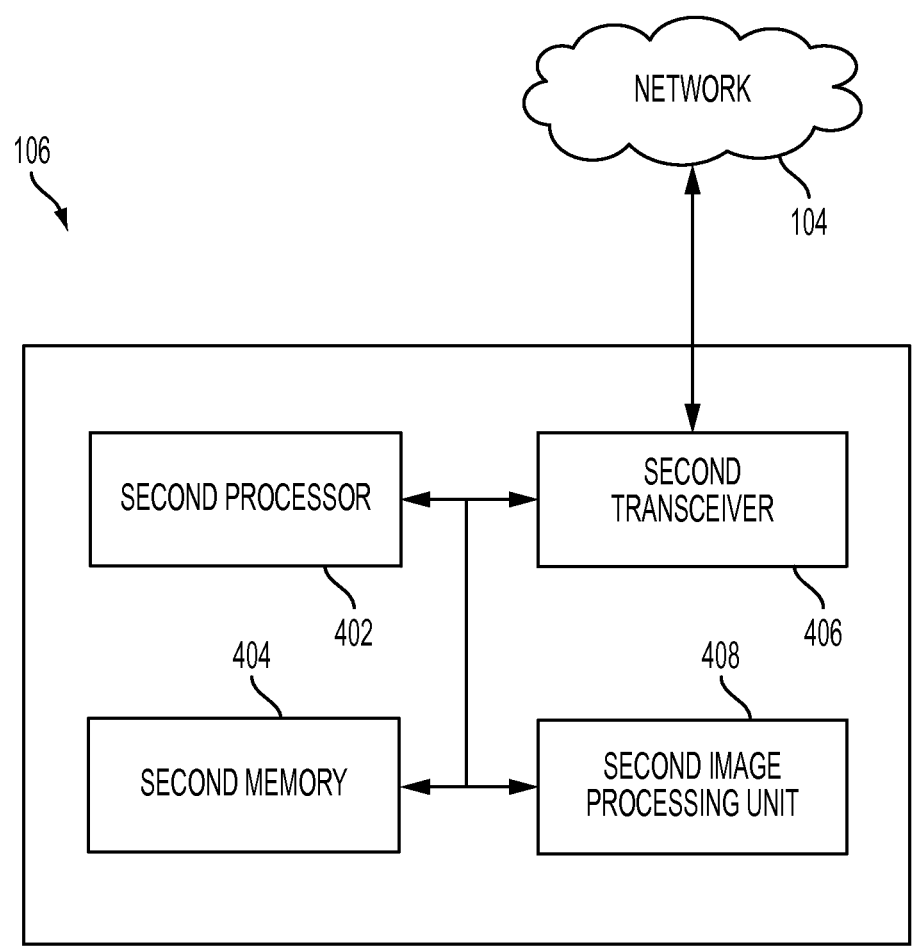
FIG. 4 is a block diagram illustrating a user-computing device, in accordance with at least one embodiment.

FIG. 4 is a block diagram illustrating the user-computing device 106, in accordance with at least one embodiment. FIG. 4 is explained in conjunction with FIG. 1, FIG. 2, and FIG. 3. In an embodiment, the user-computing device 106 includes a second processor 402, a second memory 404, a second transceiver 406, and a second image-processing unit 408.

The second processor 402 is coupled to the second memory 404, the second transceiver 406 and the second image-processing unit 408. The second processor 402 includes suitable logic, circuitry, and/or interfaces that are operable to execute one or more sets of instructions stored in the second memory 404, which utilizes the user inputs to control the one or more functionalities associated with the user-computing device 106. The second processor 402 may be implemented using one or more processor technologies known in the art. Examples of the second processor 402 include, but are not limited to, an X86 processor, a RISC processor, an ASIC processor, a CISC processor, or any other processor.

The second memory 404 stores the one or more sets of instructions, programs, codes, algorithms, data, and/or the like. Some of the commonly known memory implementations include, but are not limited to, a random access memory (RAM), a read only memory (ROM), a hard disk drive (HDD), a solid state drive (SDD), and a secure digital (SD) card. Further, the second memory 404 includes the one or more sets of instructions that are executable by the second processor 402 to perform the one or more second predefined operations by utilizing the user inputs. It is apparent to a person having ordinary skills in the art that the one or more sets of instructions stored in the second memory 404 enables the hardware of the user-computing device 106 to control the one or more functionalities associated with the user-computing device 106 based on the user input.

The second transceiver 406 transmits and receives messages and data to/from various components of the system environment 100. In an embodiment, the second transceiver 406 may be communicatively coupled to the network 104. Examples of the second transceiver 406 may include, but are not limited to, an antenna, an Ethernet port, an USB port, or any other port that can be configured to receive and transmit data. The second transceiver 406 transmits and receives data/messages in accordance with the various communication protocols, such as, TCP/IP, UDP, and 2G, 3G, or 4G communication protocols.

The second image-processing unit 408 includes suitable logic, circuitry, and/or interfaces that are operable to execute the one or more sets of instructions stored in the second memory 404 to perform the one or more second predefined operations. The one or more second predefined operations may include one or more of, but are not limited to, decompression, denoising, and segmentation. The second memory 404 may be operable to store the one or more sets of instructions that are executable by the second image-processing unit 408 to perform the one or more second predefined operations. The second image-processing unit 408 may be implemented using one or more processor technologies known in the art. Examples of the second image-processing unit 408 include, but are not limited to, an X86, a RISC processor, a CISC processor, or any other processor. In another embodiment, the second image-processing unit 408 may be implemented as an Application-Specific Integrated Circuit (ASIC) microchip designed for a special application, such as decompressing an image.

A person with ordinary skills in the art will understand that the scope of the disclosure is not limited to the user-computing device 106 as a separate entity. In an embodiment, the functionalities of the user-computing device 106 may be integrated into the MFD 102, or vice-versa.

The operation of the user-computing device 106 has been described later in conjunction with FIG. 5.

Figure 5:
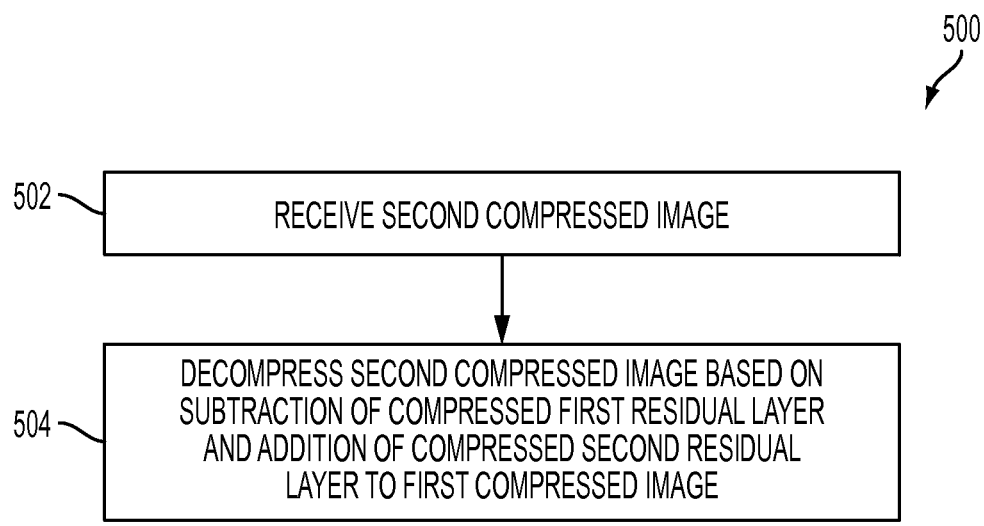
FIG. 5 is a flowchart illustrating a method for decompressing an image, in accordance with at least one embodiment.

FIG. 5 is a flowchart 500 illustrating a method of image decompression, in accordance with at least one embodiment. The flowchart 500 has been described in conjunction with FIG. 1, FIG. 2, FIG. 3, and FIG. 4.

At step 502, the second compressed image is received. In an embodiment, the second transceiver 406 may be configured to receive the second compressed image from the first transceiver 206 (in the MFD 102) over the network 104. In an embodiment, the second processor 402 may be configured to store the second compressed image in the second memory 404.

At step 504, the second compressed image is decompressed. In an embodiment, the second image-processing unit 408 may be configured to decompress the second compressed image. As discussed supra, the second compressed image comprises the first compressed image, the compressed first residual layer, and the compressed second residual layer. In an embodiment, the second image-processing unit 408 may decompress the second compressed image by utilizing one or more of the first compressed image, the compressed first residual layer, and the compressed second residual layer.

In an embodiment, the second image-processing unit 408 may decompress the second compressed image based on a subtraction of the compressed first residual layer from the first compressed image. As discussed above, the compressed first residual layer comprises the one or more first pixels that were added to the image during the lossy compression of the image. Therefore, during the subtraction of the compressed first residual layer from the first compressed image, the one or more first pixels that were introduced/added in the image during lossy compression of the image are deleted/removed from the first compressed image. In an embodiment, the second image-processing unit 408 may generate a modified first compressed image after the subtraction of the compressed first residual layer from the first compressed image.

In an embodiment, the second image-processing unit 408 may further add the compressed second residual layer to the modified first compressed image. As discussed above, the compressed second residual layer comprises the one or more second pixels that have been removed from the image during the lossy compression of the image. Therefore, during addition of the compressed second residual layer to the modified first compressed image, the one or more second pixels are added to the modified first compressed image to obtain the decompressed image.

An example of the decompression has been described later in conjunction with FIG. 6A and FIG. 6B.

Figure 6A:
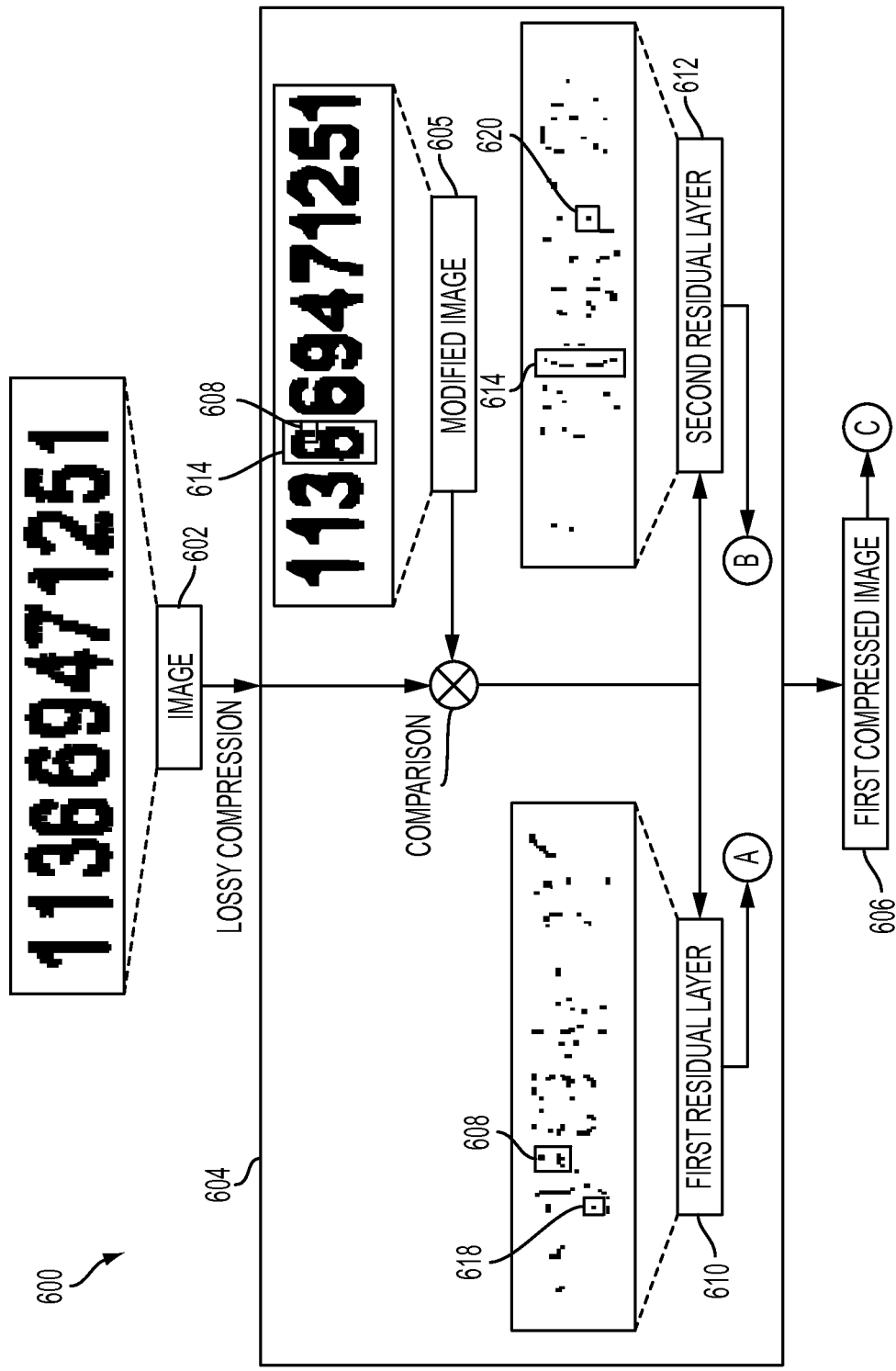
FIGS. 6A and 6B are exemplary scenarios illustrating a method for compressing an image, in accordance with at least one embodiment.
Figure 6B:
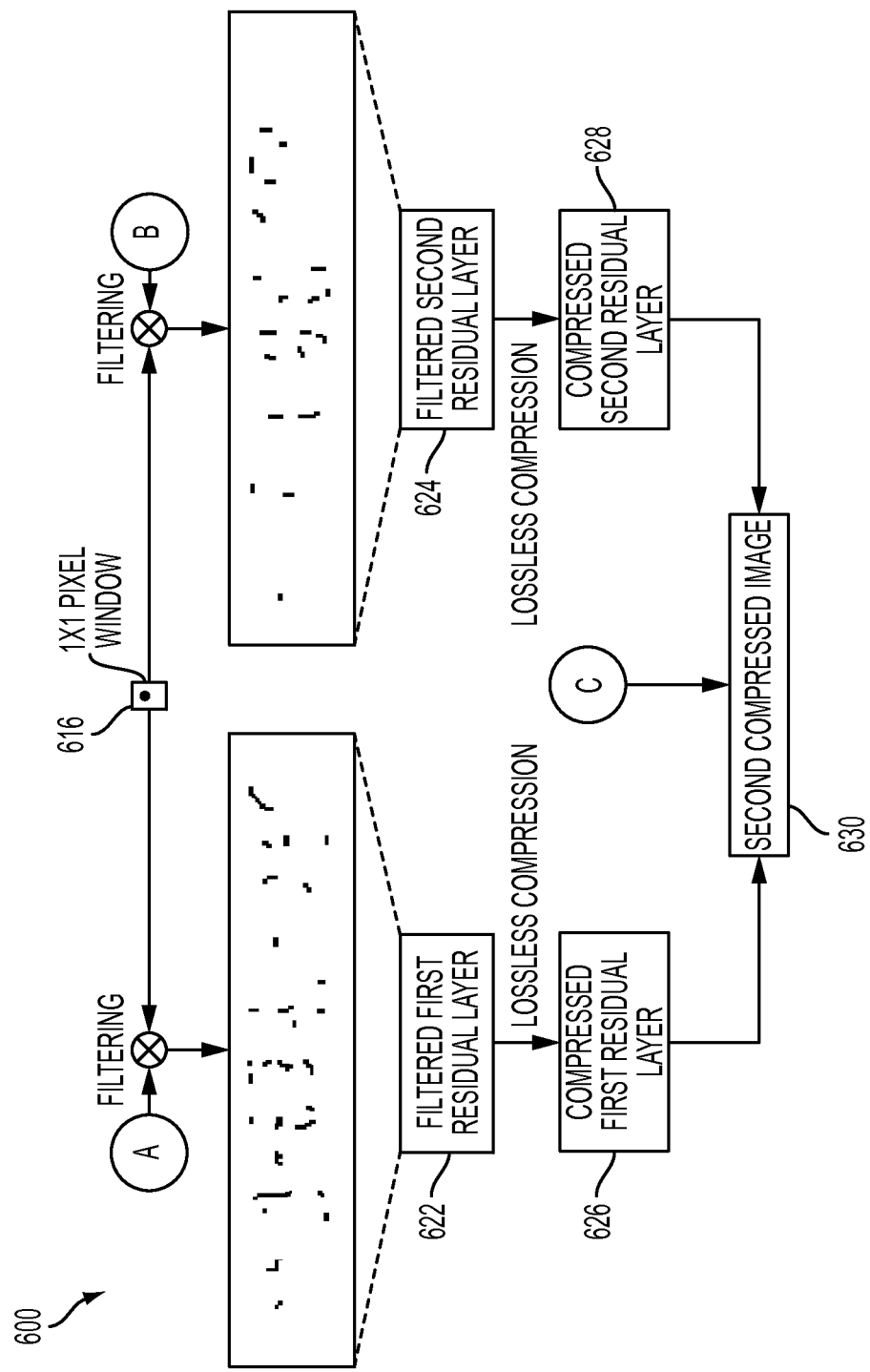

FIGS. 6A and 6B are exemplary scenarios 600 of the image compression, in accordance with at least one embodiment. The exemplary scenarios 600 is explained in conjunction with elements from FIG. 1, FIG. 2, and FIG. 3.

Referring to FIG. 6A, the image 602 corresponds to string of numerals that may be obtained based on the scan operation performed by the MFD 102. For example, the string of numerals in the image is "113669471251". After the image is obtained, the first image-processing unit 208 may perform lossy compression (depicted by 604) on the image 602 to generate the first compressed image 606. During the lossy compression (depicted by 604) of the image 602, the modified image 605 is generated as a part of the compression technique. As discussed supra that during the lossy compression of the image, the one or more first pixels (depicted by 608) are added to the image 602. Further, the one or more second pixels (depicted by 614) are removed from the image 602 during the lossy compression of the image.

In an embodiment, the first image-processing unit 208 may determine the difference between the image 602 and the modified image 605, based on the comparison, to generate the first residual layer (depicted by 610) and the second residual layer (depicted by 612). In an embodiment, the first residual layer 610 and the second residual layer 612 comprise the one or more first pixels and the one or more second pixels, respectively. For instance, the one or more first pixels added to the character "6" are depicted by 608 in the first residual layer 610. Further, the one or more second pixels removed from the character "6" are depicted by 614 in the second residual layer 612.

Referring to FIG. 6B, from the first residual layer 610 and the second residual layer 612, the set of pixels are removed. In an embodiment, the first image-processing unit 208 may filter out the set of pixels based on the pixel window of the predetermined size. For example, if the predetermined size of the pixel window is 1×1 (depicted by 616), the pixels such as pixel 618 in the first residual layer 610, are filtered out from the first residual layer 610. Similarly, in the second residual layer 612, the pixels such as pixel 620, are filtered out. In an embodiment, after filtering of the first residual layer 610 and the second residual layer 612, the filtered first residual layer 622 and the filtered second residual layer 624 are obtained.

In an embodiment, the first image-processing unit 208 may compress the filtered first residual layer 622 and the filtered second residual layer 624 to generate the compressed first residual layer 626 and the compressed second residual layer 628. Thereafter, the first image-processing unit 208 may combine the compressed first residual layer 626, the compressed second residual layer 628, and the first compressed image 606 to generate the second compressed image 630. In an alternate embodiment, the first image-processing unit 208 may combine the compressed first residual layer 626, the compressed second residual layer 628, and the modified image 605 to generate the second compressed image 630.

A person skilled in the art will understand that the exemplary scenarios 600 of image compression has been provided for illustrative purposes and should not be construed to limit the scope of the disclosure.

Figure 7:
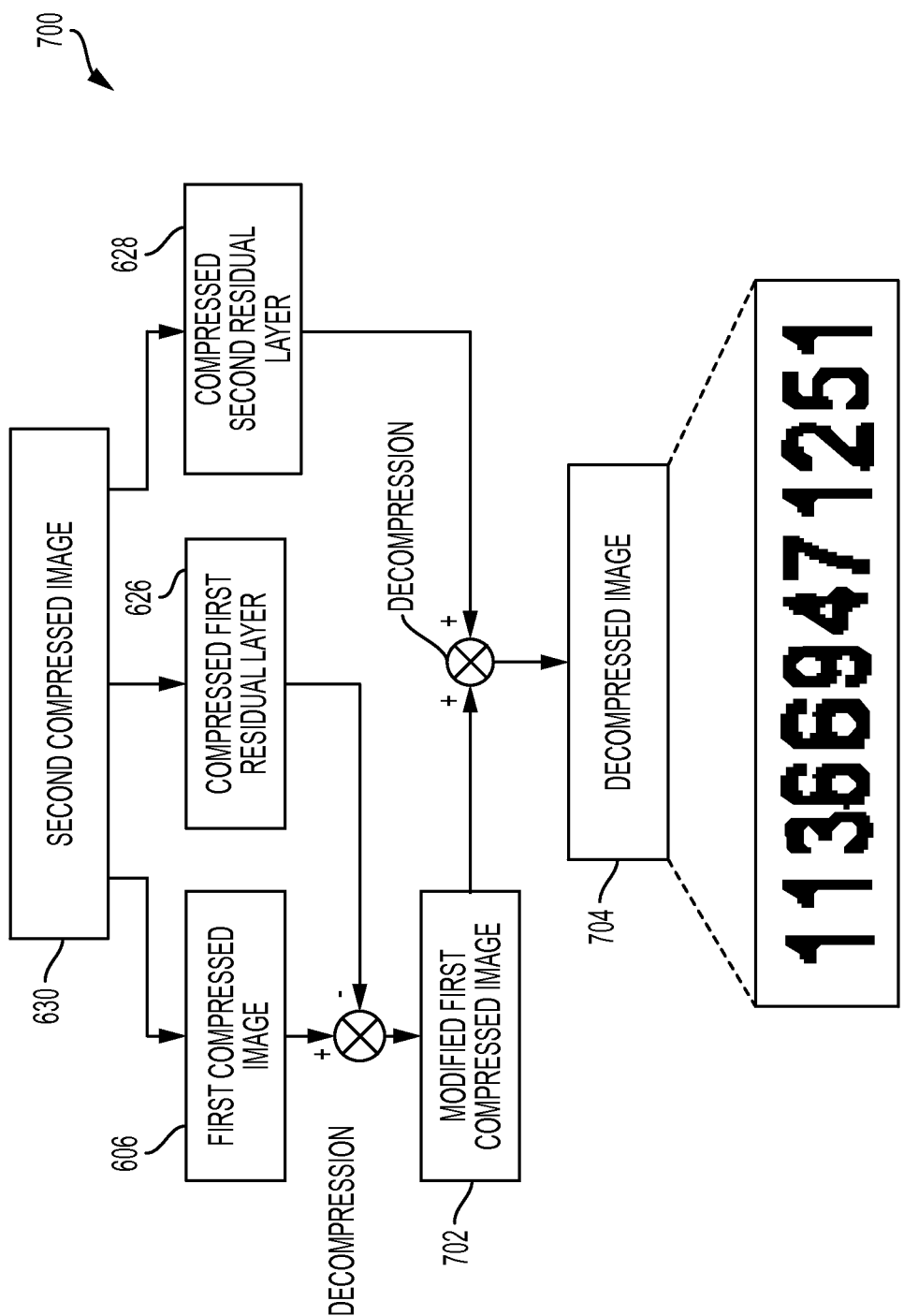
FIG. 7 is an exemplary scenario illustrating a method for decompressing an image, in accordance with at least one embodiment.

FIG. 7 is an exemplary scenario 700 of image decompression, in accordance with at least one embodiment. FIG. 7 is explained in conjunction with elements from FIG. 1, FIG. 3, FIG. 4, and FIGS. 6A and 6B.

Referring to FIG. 7, the second transceiver 406 may receive the second compressed image 630. The second compressed image 630 comprises the first compressed image 606, the compressed first residual layer 626 and the compressed second residual layer 628. In an embodiment, the second image-processing unit 408 may decompress the received second compressed image 630.

In an embodiment, the second image-processing unit 408 may perform an operation, such as a subtraction, between the compressed first residual layer 626 and the first compressed image 606 to generate the modified first compressed image (denoted by 702). During the subtraction, the one or more first pixels are deleted/removed from the first compressed image. The second image-processing unit 408 may further perform another operation, such as an addition, of the compressed second residual layer 628 and the modified first compressed image 702 to generate the decompressed image 704. During the addition, the one or more second pixels are added to the modified first compressed image (denoted by 702).

A person skilled in the art will understand that the exemplary scenario 700 of decompressing an image has been provided for illustrative purposes and should not be construed to limit the scope of the disclosure.

The disclosed embodiments encompasses numerous advantages. The method discloses an image compression technique. The disclosed methods and systems utilize a lossy compression technique along with computation of a first residual layer and a second residual layer for reducing the scanning errors. The first residual layer comprises one or more pixels that may have been added to the image during the process of the lossy compression. The second residual layer comprises one or more pixels that may have been removed/deleted from the image during the process of the lossy compression. Further, the first residual layer and the second residual layer are filtered, based on a pixel cluster or a pixel window of a predetermined size, and compressed using a lossless compression. Such method removes the one or more pixels, which were added during the compression. Further, such method includes the one or more pixels in the image, which were removed during the compression. Thus, the disclosed methods and the systems prevent character replacement errors during the image compression process along with reductions in a file size of the image.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it may be intended that the present disclosure not be limited to the particular embodiment disclosed, but that the present disclosure will include all embodiments falling within the scope of the appended claims.

What is claimed is:

1. A method of image compression, the method comprising:

generating, by one or more processors, a modified image based on a compression of an image;

generating, by the one or more processors, two residual layers that include a first residual layer and a second residual layer based on a comparison of the modified image and the image, wherein the first residual layer comprises one or more first pixels added to the image and the second residual layer comprises one or more second pixels removed from the image during the compression of the image;

filtering, by the one or more processors, a set of pixels from the first residual layer and the second residual layer;

compressing, by the one or more processors, the filtered first residual layer and the filtered second residual layer to generate a compressed first residual layer and a compressed second residual layer; and generating, by the one or more processors, a second compressed image based on the modified image, the compressed first residual layer and the compressed second residual layer.

2. The method according to claim 1, wherein the image is compressed, by the one or more processors, using a lossy compression technique.

3. The method according to claim 1, wherein the set of pixels is filtered, by the one or more processors, based on a pixel cluster or a pixel window of a predetermined size.

4. The method according to claim 1, wherein the filtered first residual layer and the filtered second residual layer are compressed, by the one or more processors, using a lossless compression technique.

5. The method according to claim 1, further comprises generating a first compressed image from the modified image, wherein the second compressed image comprises the first compressed image, the compressed first residual layer, and the compressed second residual layer.

6. The method of claim 5, wherein the second compressed image is decompressed based on at least a subtraction of the compressed first residual layer from the first compressed image.

7. The method of claim 5, wherein the second compressed image is decompressed based on at least an addition of the compressed second residual layer to the first compressed image.

8. A system for image compression, the system comprising:
one or more processors configured to:
generate a modified image based on a compression of an image;
generate two residual layers that include a first residual layer and a second residual layer based on a comparison of the first compressed image and the image, wherein the first residual layer comprises one or more first pixels added to the image and the second residual layer comprises one or more second pixels removed from the image during the compression of the image;
filter a set of pixels from the first residual layer and the second residual layer;
compress the filtered first residual layer and the filtered second residual layer to generate a compressed first residual layer and a compressed second residual layer; and
generate a second compressed image based on the modified image, the compressed first residual layer and the compressed second residual layer.

9. The system according to claim 8, wherein the one or more processors are configured to compress the image using a lossy compression technique.

10. The system according to claim 8, wherein the one or more processors are configured to filter the set of pixels based on a pixel cluster or a pixel window of a predetermined size.

11. The system according to claim 8, wherein the one or more processors are configured to compress the filtered first residual layer and the filtered second residual layer using a lossless compression technique.

12. The system according to claim 8, wherein the one or more processors are further configured to generate a first compressed image from the modified image, wherein the second compressed image comprises the first compressed image, the compressed first residual layer, and the compressed second residual layer.

13. The system according to claim 12, wherein the user-computing device is configured to decompress the second image, based on a subtraction of the compressed first residual layer and an addition of the compressed second residual layer, from/to the first compressed image.

14. The system according to claim 8, further comprising one or more transceivers configured to transmit the second compressed image to a user-computing device.

15. A computer program product for use with a computer, the computer program product comprising a non-transitory computer readable medium, wherein the non-transitory computer readable medium stores a computer program code for image compression, wherein the computer program code is executable by one or more processors to:
generate a modified image based on a compression of an image;
generate two residual layers that include a first residual layer and a second residual layer based on a comparison of the modified image and the image, wherein the first residual layer comprises one or more first pixels added to the image and the second residual layer comprises one or more second pixels removed from the image during the compression of the image;
filter a set of pixels from the first residual layer and the second residual layer;
compress the filtered first residual layer and the filtered second residual layer to generate a compressed first residual layer and a compressed second residual layer; and
generate a second compressed image based on the modified image, the compressed first residual layer and the compressed second residual layer.

* * * * *